United States Patent

[11] 3,589,142

| [72] | Inventor | Alexandre Lecomte<br>Billancourt, France |
|---|---|---|
| [21] | Appl. No. | 817,925 |
| [22] | Filed | Apr. 21, 1969 |
| [45] | Patented | June 29, 1971 |
| [73] | Assignees | Regie Nationale Des Usines Renault<br>Billancourt, France;<br>Automobiles Peugeout<br>Paris, France |
| [32] | Priority | Apr. 29, 1968 |
| [33] | | France |
| [31] | | 149,978 |

[54] UNIVERSAL JOINTS
1 Claim, 6 Drawing Figs.

[52] U.S. Cl. .................................................. 64/17
[51] Int. Cl. .................................................. F16d 3/26
[50] Field of Search .......................................... 64/17, 18,
21, 17 A; 287/89; 29/463

[56] References Cited
UNITED STATES PATENTS

| 642,477 | 1/1900 | McDowell | 29/463 |
|---|---|---|---|
| 1,551,323 | 8/1925 | Offerdahl | 287/89 |
| 2,904,975 | 9/1959 | Miller | 64/17 A |

*Primary Examiner*—Fred C. Mattern, Jr.
*Assistant Examiner*—Randall Heald
*Attorney*—Stevens, Davis, Miller & Mosher

ABSTRACT: Universal joint of the type comprising a trunnion member formed with opposed trunnions and shanked yokes pivotally mounted on said trunnions, characterized in that at least one of said yokes consists of two half-yokes assembled along a joint plane extending within the yoke shank, with mutually engageable centering elements provided on the joint planes of said half-shanks, and an assembling member surrounding said half-yokes and adapted to hold said half-yokes in their assembled condition.

PATENTED JUN 29 1971  3,589,142
FIG.2
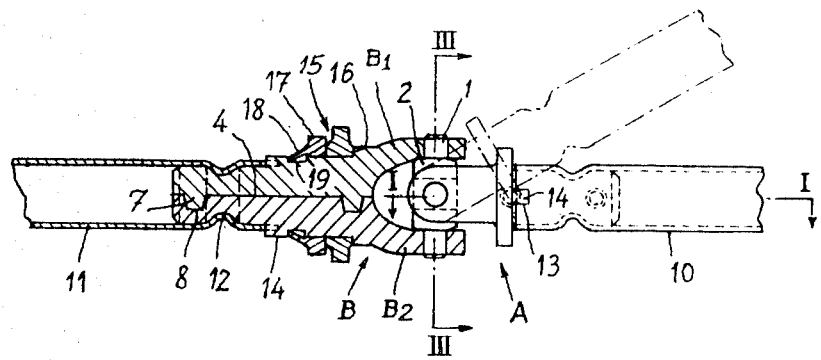
FIG.1
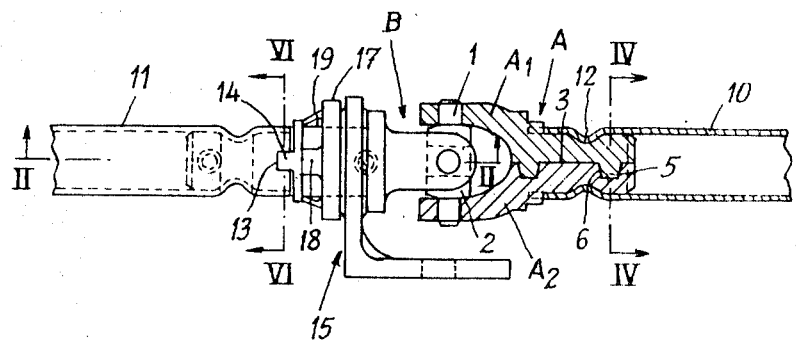
FIG.3  FIG.4  FIG.6  FIG.5
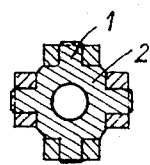 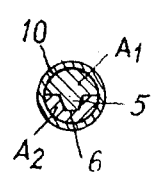 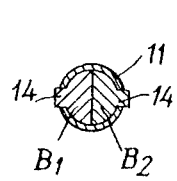 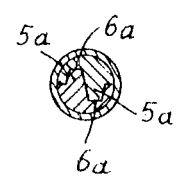
INVENTOR
ALEXANDRE LECOMTE
By Stevens, Davis, Miller & Mosher
ATTORNEYS

UNIVERSAL JOINTS

The present invention relates to universal joints and has specific reference to a form of embodiment and a mode of assembling universal joints from basic elements of particularly simplified design.

Universal joints, whether of the sliding type or not, are already known wherein the yoke is cast or machined before assembling them. These joints are advantageously utilized in various industrial fields, e.g. in the construction of automobiles, aircraft, ships, farming equipments, etc. In all cases, the dimensions of these joints are subordinate to parameters such as the rotational speed or the length and torques involved in the transmission contemplated. However, though the range of existing universal joints may be wide, it cannot meet all industrial requirements, for although the users of universal joints find the parts they need in said range, manufacturers of universal joints did not succeed up to now and so far as the applicants are aware in solving the problem of producing these joints under economical conditions as increasingly demanded by said users.

It is the object of the present invention to conveniently solve this problem by providing a universal joint particularly simple to manufacture and assemble. Basically, the universal joint according to the present invention, which is of the trunnion type, i.e. provided with opposed pairs of trunnions and with shanked yokes pivoted to said trunnions, is characterized in that at least one of said yokes consists of two half-yokes assembled along a joint plane extending along and within the yoke shank, mutually engageable centering members being provided on the joint planes of said half-shanks, and that said half-shanks are wrapped by an assembling member to keep said half-yokes in their assembled condition.

The universal joint according to this invention can be manufactured on a commercial scale without resorting to heavy investments for the necessary tools and control equipment. Moreover, it can be assembled by unskilled labor. Finally, the component elements of this universal joint afford a certain degree of miniaturization even under mass-production conditions, in contrast to conventional universal joints.

Other features and advantages of the present invention will appear as the following description proceeds with reference to the accompanying drawing illustrating diagrammatically by way of example a typical form of embodiment of universal joint according to this invention. In the drawing:

FIG. 1 is a view partly in side elevation and partly in axial section taken along the line I-I of FIG. 2, which shows an assembled universal joint constructed according to the teachings of this invention;

FIG. 2 is a view similar to FIG. 1 but with the section taken along the line II-II of FIG. 1;

FIG. 3 is a section taken across the trunnion member, along the line III-III of FIG. 2;

FIG. 4 is a cross section taken along the line IV-IV of FIG. 1;

FIG. 5 is a similar cross section showing a modified form of embodiment, and

FIG. 6 is a cross section taken along the line VI-VI of FIG. 1.

The universal joint illustrated in the drawing comprises two opposite shanked yokes denoted A and B, and pivotally mounted on opposed trunnions 1 of a trunnion member 2. Each yoke consists in this case of two half-yokes $A_1$, $A_2$ and $B_1$, $B_2$ assembled along a joint plane extending within the yoke shank and denoted 3 in the case of yoke A, and 4 in the case of yoke B. Mutually engageable centering elements are provided on these planes, these elements comprising two male elements 5 and female elements 6 on half-yokes $A_1$, $A_2$ and two male elements 7 and female elements 8 on the other half-yokes $b_1$, $B_2$.

The half-yokes are kept in their assembled condition simply by means of a member adapted to surround the half-shanks to which it is rigidly connected both axially and rotatably. In this example the assembly member consists of a tubular shaft 10 for yoke A and 11 for yoke B; this tubular shaft is constricted or crimped in a recess formed in said half-shanks which constitute a circular groove 12, after engaging axial notches 13 formed in the edge of said tubular shaft on corresponding projections or studs 14 carried by said half-shanks; in other words, the functions of rotational coupling (between said notches and projections) and axial coupling (between constricted or crimped portions and grooves 12) are obtained separately. However, according to a modified form of embodiment of this invention, both functions could be combined with each other by crimping the tubular shaft in one or a plurality of recesses formed in said half-yokes but not constituting surfaces of revolution.

The yokes may thus be assembled with each other after a preliminary and easy mounting of each half-yoke on the relevant trunnions of trunnion member 2. But this invention would still remain particularly advantageous in case the trunnion member were so designed that it could be mounted in the finished yokes, with the interposition of needle bearings fitting on said trunnions from the outside, according to a well-known practice.

FIG. 5 illustrates a modified form of embodiment wherein the male elements 5a and female elements 6a are formed on the joint plane of each half-yoke, respectively.

FIGS. 1 and 2 further illustrate a typical mounting procedure of one of the yokes of the universal joint of this invention, i.e. yoke B, in a supporting bearing 15 in which it can rotate freely, the yoke being held against axial movement on the one hand by means of a shoulder 16 formed on said yoke and on the other hand by means of an annular shaft retaining member 17 force fitted on said yoke and formed with inner radial resilient arms 18 engaging with their free ends the abutment-forming wall of a groove 19 of said yoke in the fully assembled condition illustrated.

This universal joint structure is suited both for constructions comprising cast or moulded steel half-yokes and for constructions utilizing moulded plastic elements, according to the specific applications contemplated.

I claim:

1. A universal joint comprising a trunnion member having two opposed pairs of trunnions and a shanked yoke pivotally mounted on each of said pairs of trunnions, each of said shanked yokes comprising two half-yokes and integral half-shanks, mutually engageable centering elements on the joint planes of said half-shanks, outwardly directed projections on said half-shanks and adapted to hold said shanked yokes in their assemble condition, axial notches on the tubular shafts engageable with said projections on said half-shanks, recesses in said half-shanks wherein said tubular shafts are crimped, a supporting bearing for at least one of said shanked yokes, said bearing and shanked yoke fitting in abutting relationship with each other, an annular retaining ring force fitted on said yoke against said bearing, and inwardly directed radial resilient arms on said ring engaging a groove of said yoke in the assembled condition of said shanked yoke and bearing.